> United States Patent Office 3,703,597
Patented Nov. 21, 1972

3,703,597
PREPARATION OF BENZILIC ACID COMPOUNDS
Werner B. Rothweiler, Mobile, Ala., assignor to Ciba-Geigy Corporation, Ardsley, N.Y.
No Drawing. Filed July 22, 1969, Ser. No. 843,844
Int. Cl. C07c 65/14
U.S. Cl. 260—520                4 Claims

ABSTRACT OF THE DISCLOSURE

A novel and simple procedure is provided for synthesizing benzilic acid compounds and particularly, 4,4'-dihalobenzilic acids such as, for example, 4,4'-dibromobenzilic acid and 4,4'-dichlorobenzilic acid by a novel and simple procedure involving reacting a bis-(substituted or unsubstituted phenyl) acetic acid with a halogenating agent followed by hydrolysis. The benzilic acid compounds thus produced are useful as intermediates in the preparation of benzilic acid esters, the last mentioned compounds being employed as acaricidal and insecticidal agents.

SUMMARY OF THE INVENTION

The present invention relates to a novel and simple procedure for preparing benzilic acid compounds such as 4,4'-dihalobenzilic acid compounds and illustratively, 4,4'-dibromobenzilic acid and 4,4'-dichlorobenzilic acid. 4,4'-dichlorobenzilic acid is a known compound and is disclosed, for example, in U.S. Pat. 2,745,780 while 4,4'-dibromobenzilic acid is disclosed in pending U.S. application Ser. No. 700,750, filed Jan. 26, 1968.

The process of the present invention involves reacting a halobenzene or an alkoxybenzene with glyoxylic acid or a derivative thereof and a halosulfonic acid or concentrated sulfuric acid or oleum to obtain a bis-(phenyl- or substituted phenyl) acetic acid followed by halogenating this last mentioned compound and then subjecting the intermediate to hydrolysis to obtain the desired final product, i.e., the substituted (or unsubstituted) benzilic acid. The final products thus obtained and particularly the 4,4'-dibromobenzilic acid and the 4,4'-dichlorobenzilic acid are then esterified, by a conventional procedure to obtain the esters and said esters are valuable as agricultural chemicals and particularly, as acaricides (controlling in particular Acarinae) or in controlling certain insects, such as for example, the Colorado beetle on potato plants.

DETAILED DESCRIPTION OF THE INVENTION

In attempting to prepare a benzilic acid compound and particularly 4,4'-dibromobenzilic acid, rearrangement of the 4,4'-dibromobenzil compound was required and the usual procedure for preparing a benzil compound involved the oxidation of the corresponding benzoin compound. However, benzoin per se cannot be brominated in a conventional fashion and using the procedure of H. Biltz (Berichte, vol. 41, pages 1754 and 1761, 1908), it was attempted to simultaneously brominate benzoin in the p-position and oxidize the resulting compound to benzil after condensation with urea to diphenylimidazolone and subsequent cleavage with water. However, using this procedure, difficult waste water problems were encountered.

Further, it was known that benzilic acid undergoes rearrangement in the presence of aluminum chloride resulting in a fluorene carbonic acid (Beilstein 10/I, 151) suggesting that halogenation of the nucleus was not possible. Nevertheless, bromination of benzilic acid isopropyl ester using iron (in powdered form) as a catalyst was attempted but dibromobenzilic acid could not be obtained. Further attempts were made to brominate benzilic acid in pyridine but this procedure too was unsuccessful as practically all of the starting material was recovered.

The present invention accordingly provides a simple and novel procedure whereby benzilic acid compounds are obtained in high yield. The process comprises reacting a substituted benzene that is, a halobenzene such as bromobenzene or chlorobenzene or an alkoxybenzene, with glyoxylic acid or a derivative thereof and a halosulfonic acid such as, for example, chlorosulfonic acid or bromosulfonic acid or concentrated sulfuric acid or oleum to form a bis-(phenyl or substituted phenyl)-acetic acid compound. The resulting compound is then reacted with a halogenating agent such as, for example, $PCl_3/Br_2$ followed by hydrolyzing the intermediate compound thus obtained to produce the desired benzilic acid product. The reaction is illustrated by the following series of equations:

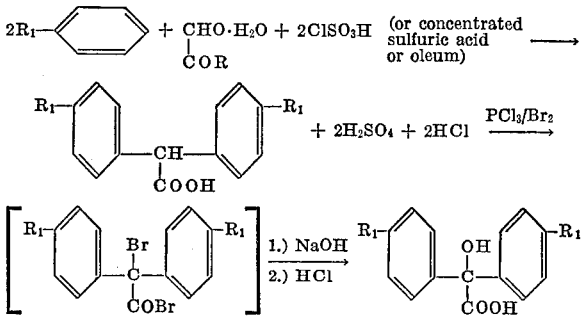

wherein

R is OH, halogen, i.e., fluorine, chlorine, bromine or iodine, O-alkali metal, O-alkaline-earth metal or O-alkyl
$R_1$ is hydrogen, alkyl, alkoxy or halogen The alkyl or alkoxy groups contain up to 6 carbon atoms and include, for example, methyl, ethyl, propyl, isopropyl, butyl, hexyl, methoxy, ethoxy, propoxy, amyloxy, and the like. Alkali-metal is intended to cover $NA^+$, $K^+$, etc.; alkaline-earth metal is intended to cover $Ca^{++}$, $Mg^{++}$, $Ba^{++}$, etc.

When it is desired to produce, for example, the 4,4'-dibromobenzilic acid, the starting material used in the present process is bromobenzene; when it is desired to produce the 4,4'-dichlorobenzilic acid, chlorobenzene is used as the starting material.

In the initial reaction, at least about 2 moles of the halobenzene compound i.e., bromobenzene, chlorobenzene, or the like, or alkoxybenzene, to about 1 mole of the glyoxylic acid (suitably in the hydrate form) or a derivative thereof and about 2 moles of the halosulfonic acid such as chlorosulfonic acid, or concentrated sulfuric acid or oleum are used. The initial reaction is conducted at a low temperature that is, at a temperature of about 20° C. or lower. Suitable glyoxylic acid derivatives include, for example, glyoxylic acid esters, salts, glyoxylic acid ester hemiacetals or glyoxylic acid ester diacetals, dialkylamino alkylammonium acetate, and the like. Such derivatives are represented as follows:

OCH—COOH or its ammonium-, sodium-, potassium-, calcium-salts, and the like
OCH—COOAlkyl, i.e. alkyl glyoxylate (ethyl glyoxylate)

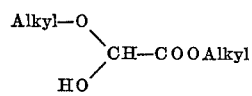

i.e., alkoxy hydroxy alkyl acetate (Alkyl-O)$_2$CH—COOAlkyl, i.e. dialkoxy alkyl acetate
(Alkyl$_2$N)$_2$CH—COOH.NH, alkyl, i.e., dialkylamino alkylammonium acetate The bis-halophenylacetic acid thus obtained is then reacted with a halogenating agent such as, for example, PCl$_3$/Br$_2$ and the intermediate halobenzilic acid compound is then hydrolyzed to obtain the desired benzilic acid final product such as, for example, 4,4'-dibromobenzilic acid, 4,4'-dichlorobenzilic acid, and the like.

The hydrolysis is conducted in the presence of an alkali-metal or alkaline-earth metal compound such as, for example, sodium hydroxide, potassium hydroxide, and the like, followed by treatment with a strong mineral acid such as, for example, hydrochloric acid, sulfuric acid, and the like.

The final benzilic acid products thus obtained such as, for example, 4,4'-dibromobenzilic acid, 4,4'-dichlorobenzilic acid, and the like, are then esterified by conventional procedures that is, by reaction with an ester of a low aliphatic alcohol or an aromatic alcohol in the presence of an inert solvent. Suitable reactive esters are the esters of hydrochloric, hydrobromic, or hydroiodic acid with methanol, ethanol, n-propanol, butanols or benzylalcohol; esters of sulfuric acid and particularly dimethylsulfate, diethylsulfate, and the like, can also be used as esterifying agents. The esters of the 4,4'-dihalobenzilic acid and particularly, the 4,4'-dibromobenzilic acid-isopropyl ester, the 4,4'-dichlorobenzilic acid-isopropyl ester, the 4,4'-dichlorobenzilic acid-benzylester, and the like, are useful in the control of Acarinae especially, mites and spiders and their preliminary stages of development even when applied to plants to be protected against these pests. The aforesaid esters are characterized by low toxicity to warm-blooded animals and particularly, the isopropyl 4,4'-dibromobenzilate is characterized by a toxicity of over 5000 mg. of active substance per kg. body weight. The aforesaid isopropyl 4,4'-dibromobezilate is also characterized by insecticidal activity against such insects as the Colorado beetle and is also suitable for the control of normally sensitive and resistant mites of the Parasitiformes, Tetrabodili, Trombidiformes and Sarcoptiformes types.

The following non-limitative examples describe the production of the benzilic acid compounds of the present invention. Unless otherwise indicated, the materials used are expressed in percentages by weight.

EXAMPLE I

In a a 2.5 liter flask, 92 g. (1 mole) glyoxylic acid hydrate 100% is added and cooled with an ice-salt mixture. Within 30 minutes, 116 g. (1 mole) chlorosulfonic acid is added while the reaction mass is agitated by means of a mechanical stirrer. After another 15 minutes there is added, accompanied by cooling and agitation, within 15 minutes, 345 g. (2.2 moles) bromobenzene. 116 g. (1 mole) chlorosulfonic acid is then added to this mixture over a period of 1.5 hours, accompanied by agitation and cooling to 0–5°. The brownish-reddish suspension is allowed to rise to 20° C. after completion of the addition. The mixture is then held at 20° C. for a period of 5 hours. During this period, HCl is evolved with decreasing intensity and the reaction mass becomes a viscous paste. The end of the HCl evolution indicates the end of the reaction. There is then added to the reaction mass, 400 ml. water and the temperature rises to 70° C. 1.4 liters of toluene is added and the mixture is heated to 80°–100° C. Agitation is stopped after the solid material goes into solution, the phases are separated and the aqueous layer is discarded. The toluene layer is washed three times with 150 ml. hot water, each time, 1 liter of toluene is distilled off followed by cooling to 0–10° C. The precipitate is filtered, washed with 200 ml. toluene and dried at 80° C. There is obtained 210 g. bis-(p-bromophenyl) acetic acid characterized by a melting point of 184° C. (a yield of 56%).

The product was thus obtained that is, bis-(p-bromophenyl)-acetic acid is converted to the desired final product that is, 4,4'-dibromobenzilic acid by the following procedure:

In a 750 ml. flask there is added 185 g. bis-(p-bromophenyl) acetic acid (0.5 mole), 100 ml. carbontetrachloride and 82.5 g. phosphorous trichloride (0.6 mole) and the mixture is heated to slow reflux (72° C.) accompanied by agitation. Over a period of 40 minutes, 192 g. (1.2 moles) bromine is added, the mixture is agitated and refluxed for 12 hours. There is then added, over a period of 10 minutes, 200 ml. water and the solution is cooled to 40° C. The reaction mass is transferred to a 2.5 liter sulfonation flask, and accompanied by agitation, 813 g. caustic (30%) is added over a 15 minute period (an exothermic reaction occurs). The reaction mixture is heated to reflux and carbontetrachloride is distilled off. Foam is formed on the solution and it disappears when all the carbontetrachloride is removed. The reaction mixture is refluxed, accompanied by agitation for an additional hour while the sodium salt of bis-(p-bromophenyl) acetic acid precipitates. The salt is filtered off. The sodium-bis-(p-bromophenyl)acetate is dissolved in 300 ml. water and charged into a 2.5 liter sulfonation flask followed by an addition of 500 ml. toluene. The solution is then heated to a temperature of 100° C. over A period of 30 minutes and then there is added thereto, acompanied by vigorous agitation, 100 g. HCl (30%). The free acid initially precipitates but then dissolved in toluene (volume 1460 ml.). When there is complete solution, the aqueous phase is separated and the toluene washed three times, with 150 ml. hot water, each time. The toluene solution is evaporated to dryness and the product is dried in an oven. There is obtained 191 g. of a slightly yellow product, i.e., 4,4'-dibromobenzilic acid possessing a melting point of 100° C.

*Analysis.*—KOCH$_3$-titration: 96.5% Bromine (Wurtz): 98.4%.

The intermediate product bis-(p-bromophenyl)-bromoacetylbromide can be isolated by diluting the brominated mixture in carbontetrachloride and washing successively at 0° C. with bisulfite solution, soda solution and water. The solution is concentrated and the product is recovered by crystallization. The product is characterized by a melting point of 115° C. and elementary analysis: IR- and NMR-spectra substantiated the structure of the molecule.

The 4,4'-dibromobenzilic acid obtained above can be esterified with p-toluene sulfonic acid and isopropanol in toluene to obtain the corresponding isopropyl ester.

Esterification is also carried out in isopropanol with HCl-gas followed by recrystallization from petroleum ether.

EXAMPLE II

Following the procedure described above except for the use of a chlorobenzene starting material and the chlorination of the intermediate bis-(bromophenyl)-acetic acid, there is obtained the corresponding 4,4'-dichlorobenzilic acid.

EXAMPLE III 61.2 g. ethylgloxylate [1] (50%) and 105 g. bromobenzene were charged into a 500 ml. three-necked round bottom flask fitted with a mechanical stirrer, thermometer and dropping funnel. To the well agitated and cooled mixture was added 400 g. sulfuric acid 100% (monohydrate) over a period of two hours so that the temperature could be kept between 0° and 5° C. After completion of the addition, the reaction mixture was allowed to warm up to ambient temperature and was stirred for an additional 16 hours. The beige suspension was poured on a mixture of 600 g. crushed ice and saturated with about 120 g. sodium chloride. The water was decanted and the residue was dis- ---
[1] The ethylgloxylate was prepared from diethyltartrate and lead tetraacetate by the procedure described in Org. Synth. Coll., vol. IV, 124.

solved in 150 ml. ethanol. To this solution was added 500 ml. sodium hydroxide (10%) and the mixture was kept boiling for two hours and in this time, the alcohol was removed and the ester was hydrolyzed. The mixture was then acidified with hydrochloric acid (10%) to give a positive reaction with Congo red and then saturated with sodium chloride. The water solution was decanted and the residue was crystallized from ethanol. There was obtained a yield of 48 g. of bis-(p-bromophenyl)-acetic acid.

EXAMPLE IV 65 g. diisopropoxy-isopropyl-acetate [2] and 105 g. bromobenzene were mixed in a 500 ml. three-neck round bottom flask fitted with a mechanical stirrer, thermometer and dropping funnel. To the well agitated and cooled mixture was added, over a period of 1.5 hours, 400 g. sulfuric acid 100% (monohydrate). After the addition, the reaction was allowed to warm up and was stirred for an additional 16 hours at ambient temperature. The red reaction mass was then poured on 600 g. crushed ice and saturated with sodium chloride. The water solution was then decanted and the residue was dissolved in 200 ml. ethanol and hydrolyzed by boiling with 500 ml. sodium hydroxide (10%) for 2 hours whereby the alcohol was evaporated. The solution was then acidified with hydrochloric acid 10% (positive reaction with Congo-red) and saturated with sodium chloride. The water solution was decanted and the residue was crystallized from ethanol. There was obtained a yield of 14 g. of bis-(p-bromophenyl)-acetic acid.

EXAMPLE V

Following the procedure of Example 1 except for the replacement of chlorosulfonic acid by sulfuric acid in the initial reaction step, there is obtained, in a yield comparable to that of Example I, the desired intermediate bis-(p-bromophenyl) acetic acid.

The invention has been described with respect to certain preferred embodiments and various modifications and variations thereof will become obvious to persons skilled in the art. It is therefore to be understood that such modifications and variations are to be included within the spirit and scope of this invention.

---

[2] Diisopropoxy-isopropyl-acetate was prepared by refluxing glyoxylic acid, isopropanol, benzene and a small amount of concentrated hydrochloric acid followed by removing the water from the reaction, azeotropically.

I claim:

1. A process for the preparation of a benzilic acid compound of the formula

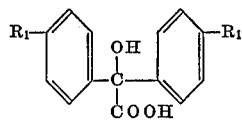

wherein
$R_1$ is hydrogen, fluorine, chlorine, bromine, iodine, alkyl or alkoxy
which comprises (A) reacting a benzene compound of the formula

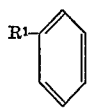

wherein
$R_1$ is hydrogen, fluorine, chlorine, bromine, iodine, alkyl or alkoxy
with a member of the group consisting of glyoxylic acid, glyoxylic acid lower alkyl esters and di-lower alkoxy acetic acid lower alkyl esters in the presence of a strong acid selected from chlorosulfonic acid, concentrated sulfuric acid and oleum, at temperatures within the range of 0° to 20° C. to obtain the corresponding diphenyl acetic acid of the formula

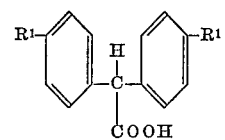

wherein
$R_1$ is hydrogen, fluorine, chlorine, bromine, iodine, alkyl or alkoxy
(B) reacting the diphenyl-acetic acid with bromine in the presence of essentially stoichiometric amounts of phosphorous trichloride in carbon tetrachloride at reflux temperature to form the corresponding diphenylhaloacetyl halide of the formula

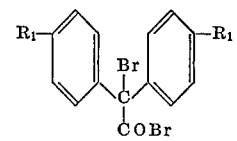

(C) immediately hydrolyzing the reaction mixture obtained in (B) with aqueous alkali metal hydroxide solution at reflux temperature of the reaction medium and at the same time evaporating off the organic solvent to obtain the benzilic acid compound in the form of its alkali metal salt and separating said salt by filtration.

2. A process according to claim 1 wherein bis-(p-bromophenyl)-acetic acid is obtained by reacting bromobenzene with glyoxylic acid in the presence of chlorosulfonic acid.

3. A process according to claim 1 wherein bis-(p-bromophenyl)-acetic acid is obtained by reacting bromobenzene with ethylgloxylate in the presence of concentrated sulfuric acid.

4. A process according to claim 1 wherein bromobenzene is reacted with diisopropoxy-isopropyl-acetate in the presence of concentrated sulfuric acid, the free halogen in (B) is bromine and the inert solvent in (B) in carbon tetrachloride.

References Cited

March: Adv. Org. Chem., pp. 303, 308 and 460.
Shacklett et al.: JACS, vol. 75, pp. 2654–7 (1953).
Klosa: Archiv de Pharma., vol. 288, pp. 42–6 (1955).

LORRAINE A. WEINBERGER, Primary Examiner
J. F. TERAPANE, Assistant Examiner

U.S. Cl. X.R.

260—473 A, 515 R, 515 A, 544 M; 424—308